(12) United States Patent
Curtner et al.

(10) Patent No.: US 7,760,908 B2
(45) Date of Patent: *Jul. 20, 2010

(54) EVENT PACKAGED VIDEO SEQUENCE

(75) Inventors: Keith L. Curtner, St. Paul, MN (US); Saad J. Bedros, West St. Paul, MN (US); KwongWing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1336 days.

This patent is subject to a terminal disclaimer.

(21) Appl. No.: 10/907,411

(22) Filed: Mar. 31, 2005

(65) Prior Publication Data

US 2006/0239645 A1    Oct. 26, 2006

(51) Int. Cl.
*G06K 9/00* (2006.01)
(52) U.S. Cl. .......................... 382/103; 348/143; 386/69
(58) Field of Classification Search ................ 382/103; 348/143, 149; 386/52, 64, 69, 117, 4, 55; 725/61, 93, 105, 116
See application file for complete search history.

(56) References Cited

U.S. PATENT DOCUMENTS

| | | | |
|---|---|---|---|
| 5,521,841 A | 5/1996 | Arman et al. |
| 5,596,994 A | 1/1997 | Bro |
| 5,634,008 A | 5/1997 | Gaffaney et al. |
| 5,708,767 A | 1/1998 | Yeo et al. |
| 5,751,336 A | 5/1998 | Aggarwal et al. |
| 5,821,945 A | 10/1998 | Yeo et al. |
| 5,828,809 A | 10/1998 | Chang et al. |
| 5,969,755 A | 10/1999 | Courtney |

(Continued)

FOREIGN PATENT DOCUMENTS

EP            1259076         11/2002

(Continued)

OTHER PUBLICATIONS

Medioni et al., "Event Detection and Analysis from Video Streams," IEE Transactions on Pattern Analysis and Machine Intelligence, vol. 23, No. 8, pp. 873-889, Aug. 2001.

(Continued)

*Primary Examiner*—Gregory M Desire
(74) *Attorney, Agent, or Firm*—Crompton Seager & Tufte LLC

(57) ABSTRACT

Methods and systems for packaging video sequences based on user-specified events are described herein. An illustrative method of event-packaging a video sequence may include the steps of acquiring a video stream containing an event of interest, extracting various event information from the video stream and storing one or more event parameters within an event database, extracting a video clip from the video stream containing the event of interest, associating metadata representing the event parameters to the video clip, and exporting the video clip containing the event of interest and associated metadata to an external agent. In certain embodiments, a video image-processing appliance manager and/or one or more appliance modules can be provided to automatically extract event information from the acquired video stream, and to manage the indexing and storage of event parameters within the event database. A graphical user interface may also be provided to permit the event information extracted from the video stream to be compared against a set of user-specified event parameters.

40 Claims, 7 Drawing Sheets

U.S. PATENT DOCUMENTS

| | | | |
|---|---|---|---|
| 5,974,235 A | 10/1999 | Nunally et al. | |
| 6,018,359 A | 1/2000 | Kermode et al. | |
| 6,091,821 A | 7/2000 | Buer | |
| 6,181,867 B1 | 1/2001 | Kenner et al. | |
| 6,222,532 B1 | 4/2001 | Ceccarelli | |
| 6,359,647 B1 | 3/2002 | Sengupta et al. | |
| 6,400,890 B1 | 6/2002 | Nagasaka et al. | |
| 6,424,370 B1 | 7/2002 | Courtney | |
| 6,445,409 B1 | 9/2002 | Ito et al. | |
| 6,570,608 B1 | 5/2003 | Tserng | |
| 6,587,637 B2 | 7/2003 | Nagasaka et al. | |
| 6,628,835 B1 | 9/2003 | Brill et al. | |
| 6,643,387 B1 | 11/2003 | Sethuraman et al. | |
| 6,721,454 B1 | 4/2004 | Qian et al. | |
| 6,724,915 B1 | 4/2004 | Toklu et al. | |
| 6,744,968 B1 * | 6/2004 | Imai et al. | 386/52 |
| 6,754,389 B1 | 6/2004 | Dimitrova et al. | |
| 6,779,027 B1 | 8/2004 | Schunicht et al. | |
| 6,845,357 B2 | 1/2005 | Shetty et al. | |
| 6,879,709 B2 | 4/2005 | Tian et al. | |
| 6,940,474 B2 | 9/2005 | Weitbruch et al. | |
| 6,940,998 B2 | 9/2005 | Garoutte | |
| 6,948,082 B2 | 9/2005 | Gschwind et al. | |
| 6,970,640 B2 | 11/2005 | Green et al. | |
| 7,020,336 B2 | 3/2006 | Cohen-Solal et al. | |
| 7,068,842 B2 | 6/2006 | Liang et al. | |
| 7,076,102 B2 | 7/2006 | Lin et al. | |
| 7,106,885 B2 | 9/2006 | Osterweil et al. | |
| 7,159,234 B1 | 1/2007 | Murphy et al. | |
| 7,200,266 B2 | 4/2007 | Ozer et al. | |
| 7,227,569 B2 | 6/2007 | Maruya | |
| 7,346,186 B2 | 3/2008 | Sharoni et al. | |
| 7,352,952 B2 * | 4/2008 | Herberger et al. | 386/4 |
| 7,469,343 B2 | 12/2008 | Ray et al. | |
| 7,469,363 B2 | 12/2008 | Meis et al. | |
| 7,570,867 B2 | 8/2009 | Barrett et al. | |
| 2001/0010541 A1 | 8/2001 | Fernandez et al. | |
| 2001/0016007 A1 | 8/2001 | Wu et al. | |
| 2002/0107949 A1 | 8/2002 | Rawson, III | |
| 2003/0051026 A1 | 3/2003 | Carter et al. | |
| 2003/0053659 A1 | 3/2003 | Pavlidis et al. | |
| 2003/0058341 A1 | 3/2003 | Brodsky et al. | |
| 2003/0067387 A1 | 4/2003 | Kwon et al. | |
| 2003/0123703 A1 | 7/2003 | Pavlidis et al. | |
| 2003/0126293 A1 | 7/2003 | Bushey | |
| 2003/0133614 A1 | 7/2003 | Robins et al. | |
| 2003/0156824 A1 | 8/2003 | Lu | |
| 2004/0062525 A1 * | 4/2004 | Hasegawa et al. | 386/69 |
| 2004/0080615 A1 | 4/2004 | Klein et al. | |
| 2004/0081333 A1 | 4/2004 | Grab et al. | |
| 2004/0120548 A1 | 6/2004 | Qian | |
| 2004/0130620 A1 | 7/2004 | Buehler et al. | |
| 2004/0252193 A1 * | 12/2004 | Higgins | 348/149 |
| 2004/0263621 A1 | 12/2004 | Guo et al. | |
| 2005/0008198 A1 | 1/2005 | Guo et al. | |
| 2006/0045185 A1 | 3/2006 | Kiryati et al. | |
| 2006/0064731 A1 * | 3/2006 | Kahle et al. | 725/105 |
| 2006/0206748 A1 | 9/2006 | Li | |
| 2006/0215752 A1 | 9/2006 | Lee et al. | |
| 2006/0215753 A1 | 9/2006 | Lee et al. | |
| 2006/0238616 A1 * | 10/2006 | Curtner et al. | 348/143 |
| 2006/0239645 A1 | 10/2006 | Curtner et al. | |
| 2008/0087663 A1 | 4/2008 | Mansbery et al. | |

FOREIGN PATENT DOCUMENTS

| | | |
|---|---|---|
| EP | 1403817 | 3/2004 |
| JP | 2000276577 | 10/2000 |
| JP | 2005295255 | 10/2005 |
| WO | WO 01/63576 | 8/2001 |
| WO | WO 2007/000637 | 1/2007 |

OTHER PUBLICATIONS

Lipton et al., "Critical Asset Protection, Perimeter Monitoring, and Threat Detection Using Automated Video Surveillance," Article on Objectvideo.com, 11 pages, printed Sep. 2004.

Lipton, "ObjectVideo Forensics: Activity-Based Video Indexing and Retrieval for Physical Security Applications," Article on Objectvideo.com, 11 pages, printed Sep. 2004.

Mills et al., "A Magnifier Tool for Video Data," Proceedings of the Conference on Human Factors in Computing Systems, pp. 93-98, May 3, 1992.

Porikli et al., "Event Detection by Eigenvector Decomposition Using Object and Frame Features," IEEE, 10 pages, 2004.

Smoliar et al., "Content-Based Video Indexing and Retrieval," IEEE MultiMedia No. 2, pp. 62-72, 1994.

* cited by examiner

EVENT PACKAGED VIDEO SEQUENCE

FIELD

The present invention relates generally to the field of video image processing. More specifically, the present invention pertains to methods and systems for packaging video sequences based on user-specified events.

BACKGROUND

Video surveillance systems are used in a variety of applications for monitoring objects within an environment. In security applications, for example, such systems are sometimes employed to track individuals or vehicles entering or leaving a building facility or security gate, or to monitor individuals within a store, office building, hospital, or other such setting where the health and/or safety of the occupants may be of concern. In the aviation industry, for example, such systems have been used to monitor the presence of individuals at key locations within an airport such as at a security gate or parking garage.

In certain applications, the video surveillance system may be tasked to record video image data for later use in determining the occurrence of a particular event. In forensic investigations, for example, it is common to task one or more video cameras within the system to indiscriminately record entire video clips that can later be analyzed to detect the occurrence of an event such as a robbery or theft. Such video images are typically stored as either analog video streams or as digital image data on a hard drive, optical drive, videocassette recorder (VCR), or other suitable storage means.

To permit prompt action to be taken upon the occurrence of an event, it is sometimes desirable to bind portions of the video sequence into a "package" containing the event, and then transmit such package to an external agent for further analysis. In certain security applications, for example, it may be desirable for a security guard to record a video clip containing facial images of an individual, and then transmit such video clip to another agent (e.g. a facial image database) for further analysis. To accomplish this task, many systems require the operator to manually scan the entire video stream until the desired event is found. In some cases, the system may require the operator to determine the time and/or date of the event as well as the particular camera or cameras used to detect the event. The lack of an automated means for providing video clips directly to an operator can thus result in increased search times and slower response times.

SUMMARY

The present invention pertains to methods and systems for packaging video sequences based on user-specified events. An illustrative method of event-packaging a video sequence may include the steps of acquiring a video stream containing an event of interest, extracting various event information from the video stream and storing one or more event parameters relating to the event within an event database, extracting a video clip from the video stream containing the event of interest, associating the event parameters to the video clip, and exporting the video clip containing the event of interest and associated event parameters to an external agent such as a terminal station or networked storage device.

In certain embodiments, a video image-processing appliance manager and/or one or more appliance modules can be provided to automatically extract event information from the acquired video stream, and/or to manage the indexing and storage of event parameters within the event database. A graphical user interface may be provided to permit the event information extracted from the video stream to be compared against a set of user-specified event parameters. In one illustrative embodiment, the user-specified event parameters may comprise a set of semantic parameters that can be used to detect and analyze various events occurring within one or more regions of interest. Other features such as a means for adjusting the pre-record and/or post record duration of the extracted video clip and a means for providing annotation information along with the extracted video clip can be further provided on the graphical user interface, if desired.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of algorithms and processes are illustrated for the various elements, those skilled in the art will recognize that many of the examples provided have suitable alternatives that may be utilized.

Figure 1:
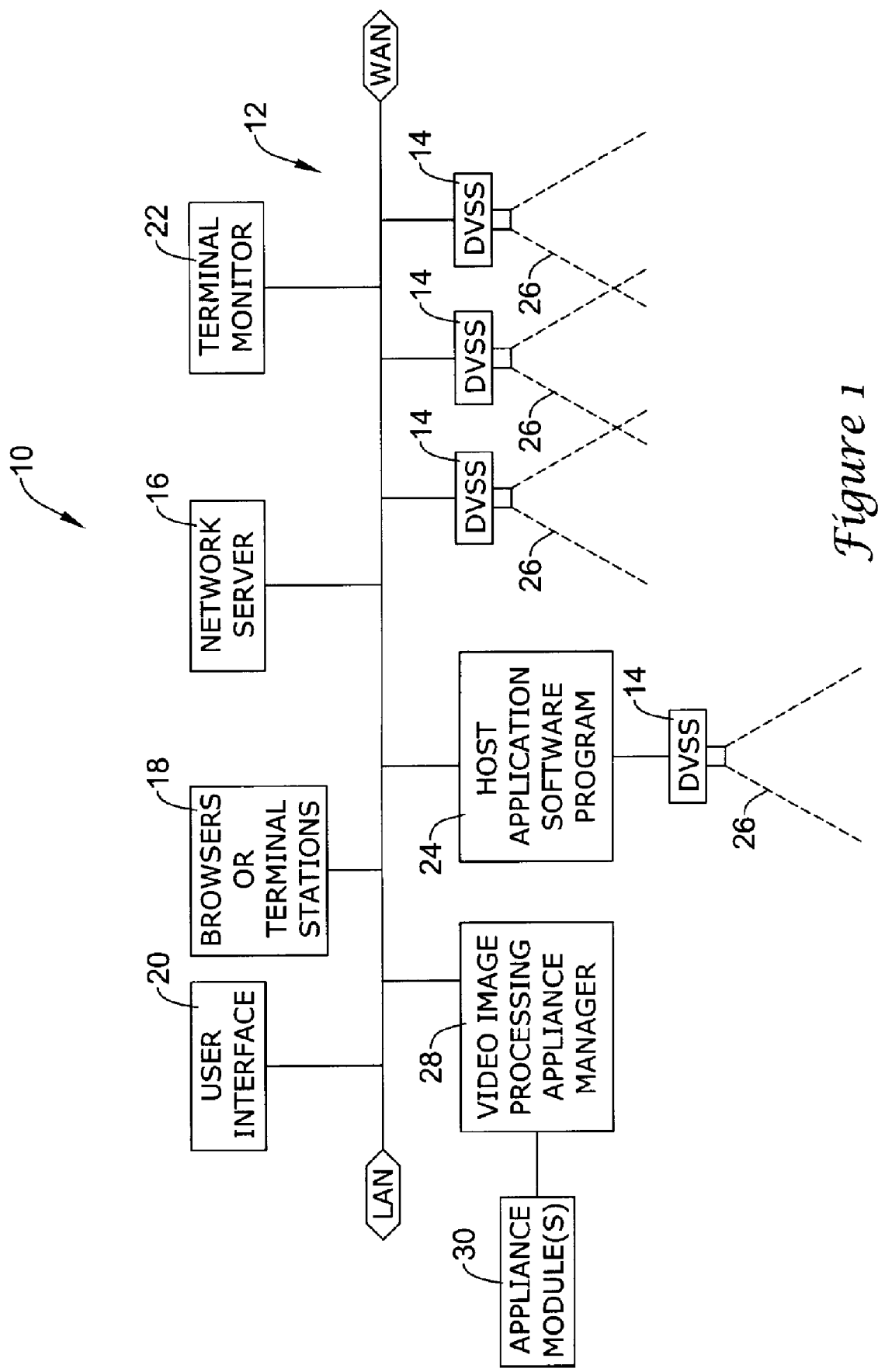
FIG. 1 is a block diagram showing an illustrative network-based video monitoring system for use in monitoring one or more regions of interest within an environment.

FIG. 1 is a block diagram showing an illustrative network-based video monitoring system 10 employing a number of digital video system sensors (DVSS's). System 10, illustratively a video surveillance system for use in detecting and monitoring objects within an environment, may comprise a network 12 such as a wired or wireless local area network (LAN) or wide area network (WAN) that can be used to connect one or more DVSS's 14 to a network server 16 or other such host application. A DVSS can be understood generally as a subsystem that provides sequences of digital video images or other desired data to the monitoring system 10. Examples of DVSS's that can be employed by the system 10 may include, but are not limited to, one or more digital cameras, analog cameras equipped with a digitizer, frame grabbers, digital video recorders, files of stored video data in a database, microphones for audio signal capture, accelerometers for seismic data capture, pressure sensors, temperature sensors, level and/or flow sensors, proximity sensors, contact sensors (e.g. window or door switches), and/or multi-spectral sensors.

A number of browsers or terminal stations 18 equipped with a user interface 20 (e.g. a graphical user interface) can be connected to the network 12 and tasked to control the operation of the DVSS's 14 in a particular manner. In some embodiments, a terminal monitor 22 (e.g. a closed-circuit television monitor) can also be provided in addition to, or in lieu of, the browsers or terminal stations 18 to view images acquired from one or more of the DVSS's 14. The browsers or terminal stations 18 can be configured to interact with a host application software program 24 that can be used to task the DVSS's 14 in a particular manner. Based on user input via the user interface 20, for example, the host application software program 24 can be used to change operational parameters of the DVSS's 14 (e.g. PTZ settings, ROI settings, resolution, frame rate, etc.), and/or to task a video image processing appliance manager 28 to perform certain user-defined tasks such as motion detection, motion tracking, etc. If, for example, the user desires to increase the resolution of images received by one or more of the DVSS's 14 in order to perform facial recognition of an individual within a region of interest, the host application software program 24 can be configured to accept a command causing one of the DVSS's 14 to zoom-in on the subject's face and increase the image capture rate. In the illustrative embodiment of FIG. 1, three DVSS's 14 are shown connected to the network 12, each of which can be tasked to acquire video and/or still images within a respective field of view (FOV) represented generally by dashed lines 26. It should be understood, however, that a greater or lesser number of DVSS's 14 may be employed, if desired. As shown in FIG. 1, the DVSS's 14 can be connected to the network 12 directly, through the host application software program 24, or both, as desired.

As can be further seen in FIG. 1, the host application software program 24 can be configured to call a video image-processing appliance manager 28 that can be used to facilitate processing of video images received from the DVSS's 14 using a number of plug-in appliance modules 30. The appliance manager 28 can be adapted to interface with the host application software program 24 as well as other components within the system 10. The video images and/or other information acquired by the DVSS's 14 can be fed through the appliance manager 28, which tasks the appropriate appliance modules 30 to determine the occurrence of any events configured within the system 10. If an event is triggered, the appliance manager 28 can be configured to output a response (e.g. via the user interface 20) indicating that an event has occurred within a region of interest. If desired, the video images triggering the event can be stored on a hard-drive, magnetic tape, or other storage medium, allowing the video images to be replayed and/or subsequently processed. In some embodiments, the video images acquired from the DVSS 14 can also be displayed in real-time on the terminal monitor 22.

Figure 2:
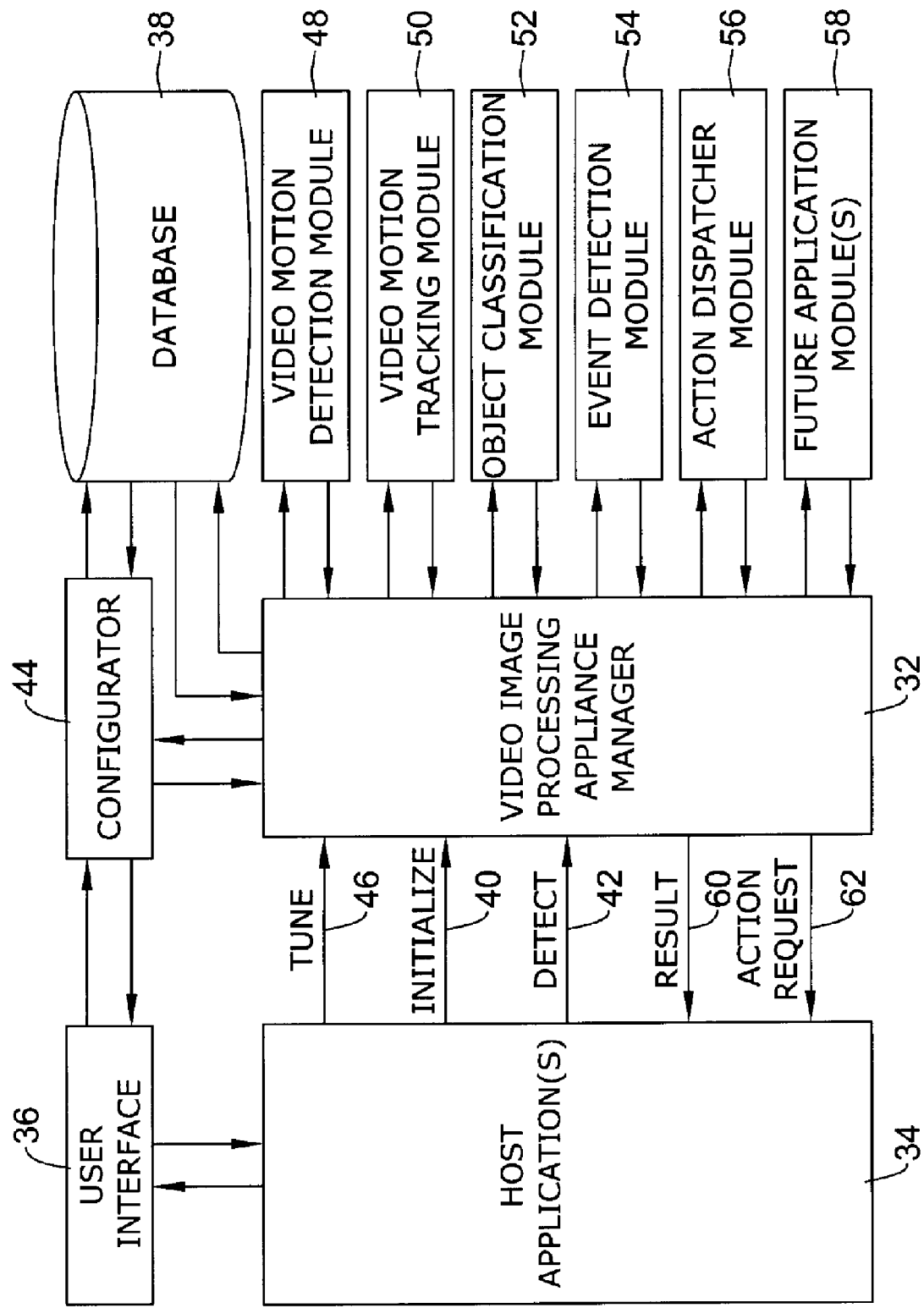
FIG. 2 is a block diagram showing the architecture of a video image-processing appliance manager in accordance with an exemplary embodiment of the present invention.

FIG. 2 is a block diagram showing the architecture of a video image-processing appliance manager 32 in accordance with an exemplary embodiment of the present invention. As shown in FIG. 2, the appliance manager 32 may provide an interface to a number of host applications 34, which as is described above with respect to FIG. 1, can include various software algorithms and/or functionality for operating a number of DVSS components. The host applications 34 may include, for example, an existing host application software program configured to interact with one or more video cameras (e.g. DVSS's) each adapted to acquire video images within a field of view (FOV). The appliance manager 32 can also be interfaced with other types of DVSS's including, but not limited to, frame grabbers, digital video recorders, files of stored video data in a database, microphones for audio signal capture, accelerometers for seismic data capture, pressure sensors, temperature sensors, level and/or flow sensors, proximity sensors, contact sensors (e.g. window or door switches), and/or multi-spectral sensors, as desired.

The host applications 34 can comprise separate components from the DVSS's (e.g. a stand-alone software package), or can be formed integral with one or more of the DVSS's and provided as a single component, if desired. In certain embodiments, for example, one or more of the DVSS's may comprise a physically separate video camera that is connected to an existing software-based host application adapted to run on the Internet, an intranet connection, and/or on an individual workstation equipped with a user interface 36. In such applications, each of the associated DVSS's can be connected to their associated host application 34 using an application program interface (API) or other suitable interface.

The host applications 34 may comprise one or more existing host application software programs contained on a network server, browser, terminal station, or other platform. The functionality provided by the existing host applications 34 will typically vary depending on their intended use. If, for example, the host applications 34 are adapted to interface with network-based control, access, and security systems/products, the host applications 34 may include an existing security software program that can be used to task a number of DVSS's to pan, tilt, and zoom to a tracked motion within a region of interest. Examples of other types of host applications 34 may include, but are not limited to, building management applications (e.g. HVAC control), life safety applications (e.g. fire protection, medical care, etc.), asset location applications, and energy management applications.

The appliance manager 32 will typically comprise a separate module from the host applications 34, allowing the appliance manager 32 to be linked with the user's existing system without having to significantly modify or reprogram the existing software to accommodate new DVSS clients as they are added to the system. It should be understood, however, that the appliance manager 32 and host applications 34 could be incorporated together as a single, stand-alone module, if desired.

The appliance manager 32 can be configured to maintain one or more business objects, which can include various information about the region or regions of interest to be monitored, any events configured by a configurator 44, as well as various configuration information about the host applications 34 connected to the system. In certain embodiments, for example, the appliance manager 32 can be configured to maintain a camera structure list and an event structure list containing information about the type of DVSS's employed and the type of events configured within the system. Such lists can be stored within a memory unit or database (e.g. database 38) and recalled each time the appliance manager 32 receives an initialization call 40 or detection call 42 from one or more of the host applications 34.

The video monitoring system may include a configurator 44 that can be used in the direct manipulation and configuration of images or other data received by the host applications 34. A tuning request/call 46 received from one or more of the host applications 34 can be used by the configurator 44 to tune the appliance manager 32 and/or other desired system components to function in a particular manner. If, for example, a user desires to increase the frame capture rate of one of the DVSS's 14 (e.g. a video camera) field of view, the host application 34 can be configured to send a tuning request or call 46 to the appliance manager 32 that can be used by the configurator 44 to coordinate such a change. Once the change has been made, the appliance manager 32 can then be configured to pass the newly configured video stream through. In some embodiments, the configurator 44 can also be configured to send a response to the host application 34 and/or to the user indicating whether the tuning invocation succeeded or failed.

The appliance manager 32 can be connected to a database 38 that can be configured to store information received from the DVSS's as well as parameters received by the configurator 44, as directed by the appliance manager 32 and/or user via the user interface 36. In certain embodiments, the database 38 can be two separate databases residing at different servers, wherein one database can be linked to the host application 34 and the other database can be linked to the appliance manager 32. In other embodiments, the database 38 may comprise a single database, or multiple databases existing on a single server.

The appliance manager 32 can be configured to interact with a number of plug-in appliance modules each adapted to run various video image-processing algorithms or routines that can be used to perform certain user-defined image processing functions. In the illustrative embodiment of FIG. 2, for example, the appliance manager 32 is shown operatively connected to a video motion detection (VMD) module 48, a video motion tracking (VMT) module 50, an object classification (OC) module 52, an event detection module 54, and an action dispatcher module 56. The various appliance modules 48, 50, 52, 54, 56 can be provided as either software appliances adapted to be run on a network or terminal server, or as separate hardware units that can be plugged into the appliance manager vis-à-vis a network bridge or other suitable connection. These modules 48, 50, 52, 54, 56 can be upgraded, when needed, to enhance performance and/or meet specific host application requirements.

The appliance manager 32 can be configured to permit the modular incorporation of future appliance modules 58, as desired. If, for example, the user desires to add a facial detection module or rapid eye detection module to the video monitoring system, the appliance manager 32 can be configured to accept a software call, network socket, physical port (e.g. a USB port, Firewire/IEEE 1394 port, parallel/serial port, etc.), and/or wireless port that can be used to add the additional modules. Since an appliance manager 32 is provided to interface with the host applications 34, the addition of future plug-in modules does not require the user to re-code or re-formulate the existing host applications 34. In addition, the appliance manager 32 may provide the user with the ability to change the implementation and/or features of existing functionality without significantly affecting the operation of the DVSS's.

The appliance manager 32 can be configured to run a video image-processing algorithm or routine that continuously monitors the camera structure list and configured events list to determine whether an event has been detected by one or more of the DVSS's. When an event contained within the event list is detected, the appliance manager 32 can be configured to transmit a result 60 back to the host application 34 along with an action request 62 tasking one or more of the DVSS's to operate in a particular manner. If, for example, the video motion tracking module 50 detects that an object is moving in a particular direction within a region of interest, the appliance manager 32 can be configured to provide a result 60 to the appropriate host application 34 informing it that the object is being tracked along with an action request 62 tasking one or more associated DVSS's to track the object.

Figure 3:
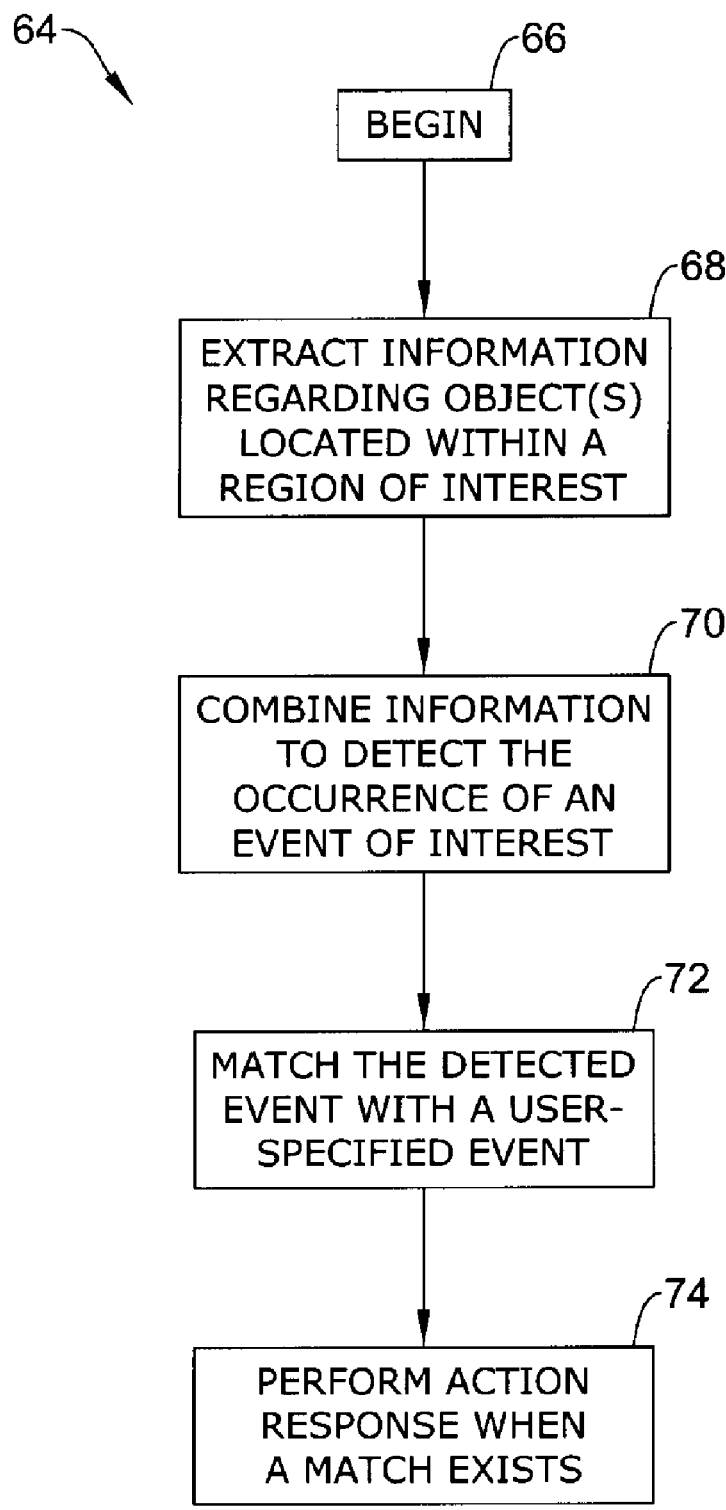
FIG. 3 is a flow chart showing an illustrative method of defining and analyzing events occurring within a region of interest of a video monitoring system in accordance with an exemplary embodiment of the present invention.

Turning now to FIG. 3, an illustrative method 64 of defining and analyzing events occurring within a video monitoring system will now be described in the context of the illustrative appliance manager 32 of FIG. 2. As shown in FIG. 3, method 64 may begin at block 66, wherein a call is received by the appliance manager 32, causing the appliance manager 32 to initialize an algorithm or routine therein that can be used in defining, detecting, analyzing, indexing, and/or retrieving one or more events of interest. In the context of the illustrative video monitoring system 10 described above with respect to FIG. 1, for example, such appliance manager 32 may be called when a user and/or host application desires to task one or more DVSS's 14 to detect the occurrence of an event within a field of view.

Once invoked, the appliance manager 32 can be configured to task one or more of the appliance modules to extract information regarding one or more objects located within a region of interest, as indicated generally by reference to block 68. Information that can be extracted at this step may include, for example, information about an object's motion, trajectory, orientation, size, aspect ratio, color, lighting, temperature, and/or information about an object's type or classification (e.g. "human", "animal", "vehicle", "animate", "inanimate", etc.). Such extracted information can be obtained using one or more of the appliance modules 48, 50, 52, 54 described above with respect to FIG. 2. If, for example, the user wishes to define an event that detects and tracks vehicle motion within a parking garage, the appliance manager 32 tasks the video motion detection module 48 and video motion tracking module 50 to run separate algorithms or routines that can be used to perform such tasks. Information regarding the classification of the object, in turn, can be determined by invoking the object classification module 52 and running an algorithm or routine therein that determines whether an object is a vehicle. In some embodiments, the appliance manager 32 can be configured to task a video face detection module and/or video face tracking module to run separate algorithms or routines that can be used to gather information to perform facial recognition on individuals. The types of information extracted by the monitoring system will typically vary depending on the types of video cameras employed, the location of the video cameras, the particular appliance module(s) available to the system, as well as other factors.

Once the information is extracted within a region of interest, the appliance manager 32 tasks the event detection module 54 to combine this information in a meaningful manner to detect the occurrence of an event of interest, as indicated generally by reference to block 70. Each event of interest can be specified by a set of conditions and/or sub-conditions that identify the object and semantically describe its state and/or physical features relative to a particular region of interest. In certain embodiments, for example, each condition and/or sub-condition can be quantified by a set of semantic parameters that can be compared against a corresponding set of semantic parameters programmed within the event detection module 54. Examples of such semantic parameters may include, but are not limited to, information regarding the region of interest (e.g. "entranceway", "parking garage", "security zone", "conveyor belt", etc.), actions relating to the object (e.g. "start", "stop", "enter", "exit", etc.), and information regarding the direction of the object (e.g. "left", "right", "top" bottom", etc.). In some embodiments, semantic parameters relating to the type or classification of object detected (e.g. "human", "animal", "vehicle", "animate", "inanimate", "other", "any", etc.) may also be provided. In other embodiments, semantic parameters relating to the type of motion (e.g. walk, run, high speed, low speed, etc.) may also be provided. Semantic parameters relating to the physical appearance (e.g. color and size of object, single or group of people) or for a particular detected face (e.g. "happy," "neutral", "sad", etc.) may also be provided, if desired.

Once the semantic parameters are combined and analyzed to detect the occurrence of an event, such information can be compared against a set of user-specified events, as indicated generally by reference to block 72. Matching of the detected event with a corresponding user-specified event can be accomplished automatically by comparing the semantic parameters determined by the appliance modules with a set of semantic parameters specified by the user. If, for example, an event occurring within a region of interest is defined using a set of semantic parameters including the text "vehicle", "enters from right", and "within ROI 1", such event can be compared against a set of user-specified semantic parameters containing the text "vehicle enters from right in ROI 1" to find a match. In certain embodiments, such user-specified semantic parameters can be stored as event parameters within an image database (e.g. database 38), and can be provided to the event detection module 54 through the appliance manager 32 via a graphical user interface or other suitable interface. Indexing and/or subsequent retrieval of such events can also be accomplished in a similar manner using such semantic parameters, if desired.

When a match exists, the appliance manager 32 invokes the action dispatcher module 56 to set up the appropriate action request or requests and perform an action response, as indicated generally by reference to block 74. In certain embodiments, for example, the action dispatcher module 48 can be configured to trigger an alarm or other such response to notify a user when a configured event has been detected. The appliance manager 32 can also be configured to record a video clip containing the detected event and/or send a video feed to a terminal station, browser, network server, or other such location for further analysis by a user and/or host application. In some embodiments, the video feed may contain one or more supporting event parameters. Other action responses such as that described below with respect to the illustrative graphical user interface 122 of FIG. 6 can also be performed, if desired.

Figure 4:
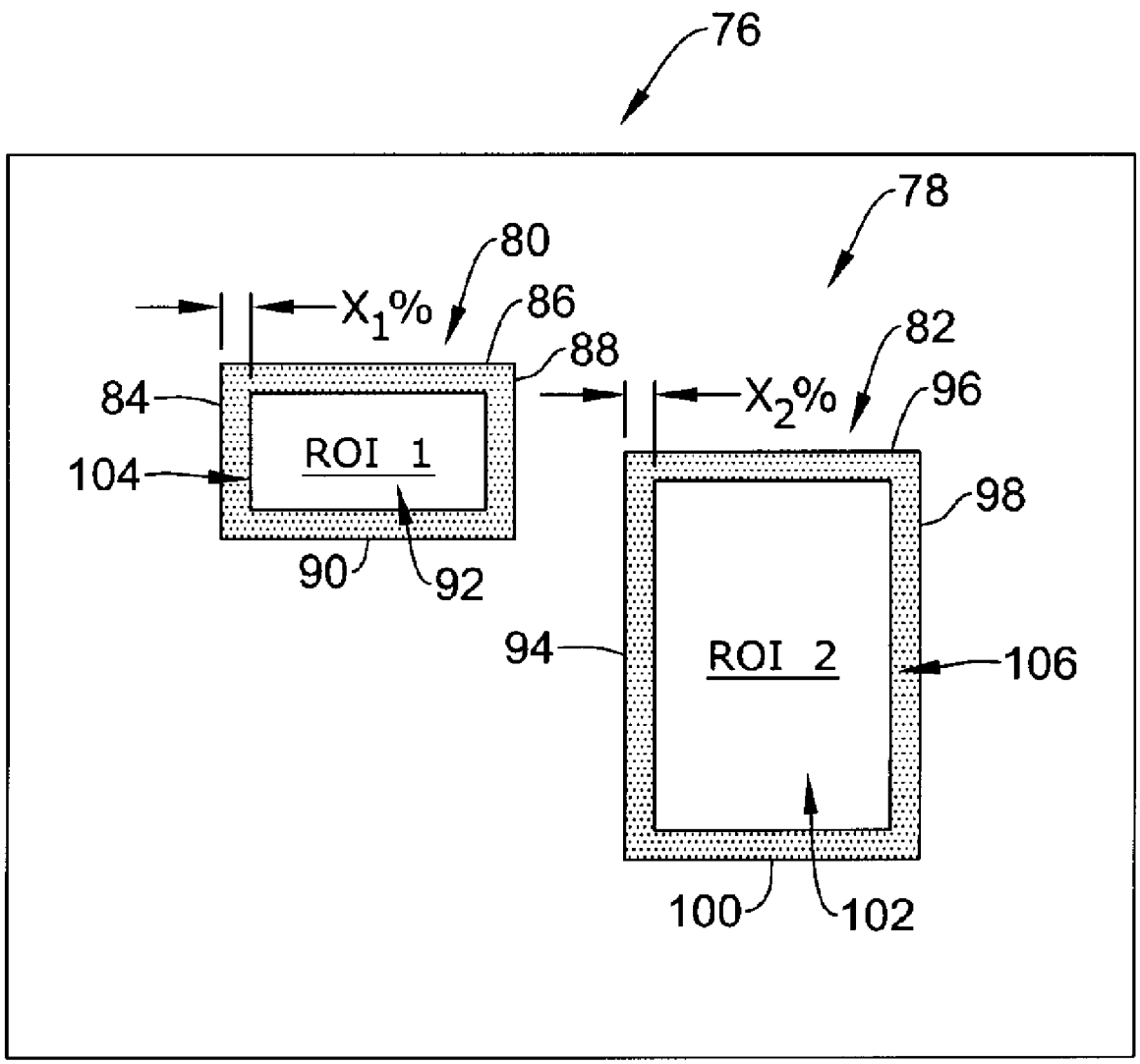
FIG. 4 is a pictorial view showing an illustrative video frame including multiple regions of interest.

FIG. 4 is a pictorial view showing an illustrative video frame 76 including multiple regions of interest. As can be seen in FIG. 4, video frame 76 may define a pixel area 78 having a first region of interest 80 and a second region of interest 82. The first and second regions of interest 80, 82 may represent, for example, regions of interest within a security zone or other such area in which the monitoring of individuals, vehicles, or other objects of interest is desired. In certain embodiments, for example, the first region of interest 80 may represent an entranceway of a building or structure whereas the second region of interest 82 may represent a parking garage or carport. While two regions of interest 80, 82 are specifically depicted in the illustrative view of FIG. 4, it should be understood that a greater or lesser number of regions of interest could be defined. Moreover, while the two regions of interest 80, 82 are shown having a substantially rectangular shape in FIG. 4, it should be understood that the regions of interest 80, 82 may assume other polygonal shapes within the video frame 76. If, for example, a particular region of interest to be monitored comprises a parking lot, then a more complex polygonal shape approximating the boundaries of that region may be utilized.

The first and second regions of interest 80, 82 may be shaped as any closed polygon in the image defined by the vertices of the polygon. In the illustrative view of FIG. 4, for example, the first region of interest 80 is shown as a polygon (e.g. a rectangle) having a left side boundary 84, a top side boundary 86, a right side boundary 88, and a lower side boundary 90, which define a first pixel area 92 within the video frame 76. In similar fashion, the second region of interest 82 is shown as a polygon having a left side boundary 94, a top side boundary 96, a right side boundary 98, and a lower side boundary 100, which define a second pixel area 102 within the video frame 76. In the illustrative video frame 76 depicted in FIG. 4, the pixel areas 92, 102 defined by each respective region of interest 80, 82 are non-overlapping such that none of the image pixels contained in the first pixel area 92 overlap with any of the image pixels contained in the second pixel area 102. It should be understood, however, that other embodiments are envisioned wherein portions of the regions of interest 80, 82 overlap one another. In some embodiments, other polygons having a non-rectangular shape may be defined as the ROI. In such case, the major and minor axes of the ROI are determined and a rectangular region defined by the major and minor axes can be used for evaluating the event conditions, as described below.

As can be further seen in FIG. 4, the first and second regions of interest 80, 82 may each define an ROI boundary area 104, 106, which as indicated by shading, can be located about the outer periphery of each respective pixel area 92, 102. Each ROI boundary area 104, 106 can be defined as a percentage or fraction of the total number of pixels contained within the pixel area 92, 102. In the illustrative video frame 76 of FIG. 4, for example, the first and second regions of interest 80, 82 may have respective ROI boundary areas 104, 106 defined as percentage values $x_1\%$ and $x_2\%$, respectively, wherein each percentage value $x_1\%$, $x_2\%$ is expressed as a percentage of the pixel area of the ROI boundary area 104, 106 relative to their corresponding pixel area 92, 102. The size, shape and locations of the ROI boundary areas 104, 106 may vary depending on the type of region selected by the user, the characteristics of the objects located within that scene, as well as other factors. Thus, while rectangular-shaped ROI boundary areas 104, 106 are specifically depicted in the illustrative embodiment FIG. 5, it should be understood that other types of ROI boundary areas 104, 106 can be utilized. If, for example, the ROI to be monitored is a building or structure having an irregular shape, then the ROI boundary area 104, 106 used to define that ROI may have also have an irregular shape to better approximate the ROI. Such irregular shape may be defined, for example, by selecting a greater number of reference points on the video frame 76, using curved lines to define the boundary area, and/or by some other suitable technique. The number of ROI's located within the video frame 76 may vary depending on the number of ROI's to be monitored.

Figure 5:
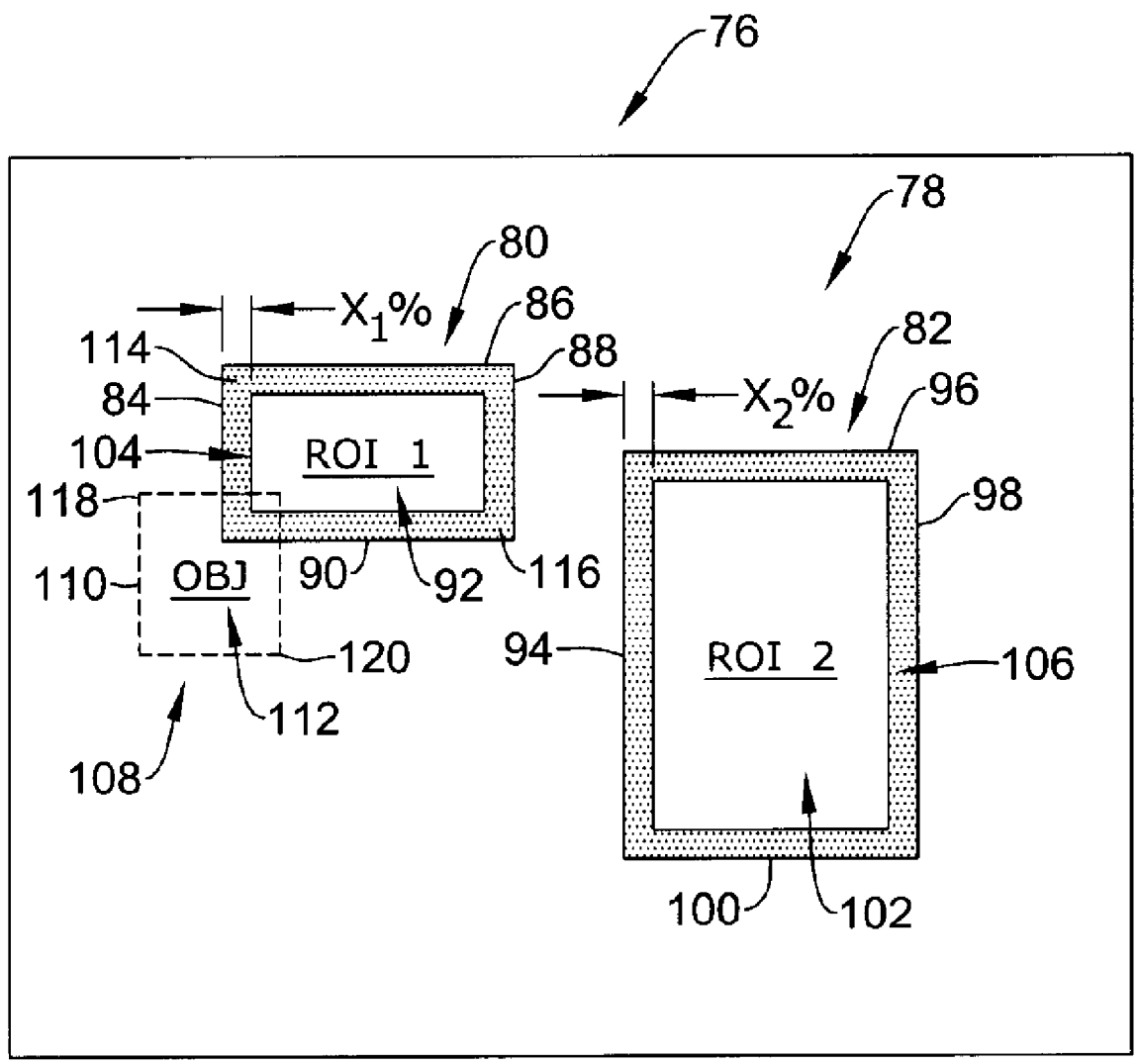
FIG. 5 is another pictorial view of the illustrative video frame of FIG. 4 showing the juxtaposition of a minimum boundary rectangle of an object within a region of interest.

FIG. 5 is another pictorial view of the illustrative video frame 76 of FIG. 4 showing the juxtaposition of a minimum boundary rectangle 108 of an object within the first region of interest 80. As shown in FIG. 5, the minimum boundary rectangle 108 may include an outer boundary 110 defining an area 112 containing an object OBJ such as an individual or vehicle. In the illustrative view depicted in FIG. 5, the minimum boundary rectangle 108 is shown covering a lower-left portion of the ROI boundary area 104, intersecting the left side boundary 84 and bottom side boundary 90 of the first region of interest 80.

Using the minimum boundary rectangle 108 to represent the general shape of the object OBJ, a number of events relating to the object's motion relative to the first region of interest 80 can be determined by comparing the coordinates of the ROI boundary area 104 with a corresponding set of coordinates of the minimum boundary rectangle 108. In the illustrative embodiment of FIG. 5, for example, an upper-left location 114 and lower-right location 116 of the ROI boundary area 104 can be assigned a set of coordinates of $(R_{X1}, R_{Y1})$ and $(R_{X2}, R_{Y2})$, respectively. In similar fashion, an upper-left location 118 and lower-right location 120 of the minimum boundary rectangle 108 can be assigned a corresponding set of coordinates $(O_{X1}, O_{Y1})$ and $(O_{X2}, O_{Y2})$, respectively. A similar coordinate scheme can be utilized for other objects and regions of interest situated within the video frame 76, as desired.

While the upper-left and lower-right locations 114, 116, 118, 120 are selected in FIG. 5 as reference points to determine the position of the minimum boundary rectangle 108 relative to the first region of interest 80, it should be understood that other reference locations could also be utilized, if desired. In one alternative embodiment, for example, the lower-left and upper-right locations of the first ROI boundary area 104 and minimum boundary rectangle 108 could be used as reference points. Moreover, while the use of a minimum boundary rectangle 108 is specifically shown in the illustrative view of FIG. 5, those of skill will recognize that other boundary shapes could be used to approximate the size and/or contour of the object. Moreover, annotation information such as object labels, motion trails, motion direction arrows, highlighting of detected objects, etc. can be further provided to aid the user in identifying and tracking objects within the video frame 76, if desired.

In certain embodiments, and as further shown in Table 1 reproduced below, the sets of upper-left and lower-right coordinates $(R_{X1},R_{Y1}),(R_{X2},R_{Y2})$ and $(O_{X1},O_{Y1}),(O_{X2},O_{Y2})$ can be used to define various event conditions (i.e. semantic parameters) relating to the object's location and direction relative to the ROI boundary area 104 by comparing the corresponding coordinate values. If, for example, the left side of the minimum boundary rectangle 108 is located within the left side boundary 84 of the ROI boundary area 104, then the equation $0<O_{X2}-R_{X1}<x_1\%(R_{X2}-R_{X1})$ will be satisfied, thus indicating that a "Left" event has occurred. Conversely, if the right side of the minimum boundary rectangle 108 is located within the right side boundary 88 of the ROI boundary area 104, then the equation $0<R_{X2}-O_{X1}<x_1\%(R_{X2}-R_{X1})$ will be satisfied, indicating that a "Right" event condition has occurred. In similar fashion, if the bottom side of the minimum boundary rectangle 108 is located within the top side boundary 86 of the ROI boundary area 104, then the equation $0<O_{Y2}-R_{Y1}<x_1\%(R_{Y2}-R_{Y1})$ will be satisfied, indicating that a "Top" event condition has occurred. Likewise, if the top side of the minimum boundary rectangle 108 is located within the bottom side boundary 90 of the ROI boundary area 104, then the equation $0<R_{Y2}-O_{Y1}<x_1\%(R_{Y2}-R_{Y1})$ will be satisfied, indicating that a "Bottom" event condition has occurred. If desired, motion in directions other than "left", "right", "top", and "bottom" may also be determined. In addition, other event conditions (e.g. "Start Track", "Enters Region", "Stop Track", "Exits Region", etc.) may also be defined by determining the state of the object track and comparing the coordinate values of the minimum boundary rectangle 108 relative to the ROI boundary area 104, and/or by comparing the location of the minimum boundary rectangle 108 relative to other locations within the video frame 76.

TABLE 1

| Event Name | Definition of Event |
| --- | --- |
| "Start Track" | Object establishes a new track within the video image and the sides of the object's MBR are not within the ROI boundary area |
| "Enters Region" | Object establishes a new track and any one side of the object's MBR is located within the ROI boundary area |
| "Stop Track" | Track of object ends within the video image and the sides of the object's MBR are not within the ROI boundary area |
| "Exits Region" | Track of object ends within the video image and any one side of the object's MBR is located within the ROI boundary area |
| "Left" | The left side of the MBR of the object is located within the left ROI boundary area |
| "Right" | The right side of the MBR of the object is located within the right ROI boundary area |
| "Top" | The top side of the MBR of the object is located within the top ROI boundary area |
| "Bottom" | The bottom side of the MBR of the object is located within the bottom ROI boundary area |

In certain cases, multiple event conditions may be satisfied for the same object. If, as shown for example in FIG. 5, the minimum boundary rectangle 108 of the object OBJ enters the ROI boundary area 104 simultaneously from both the left and bottom side boundaries 84, 90, a "Left" and "Bottom" event condition will be detected. In such case, the monitoring system can be configured to combine the two semantic parameters into a string of semantic parameters using a suitable Boolean operand such as "and" or "+". Once the event conditions (i.e. semantic parameters) are combined, the monitoring system can then be configured to match these event conditions with a corresponding set of event conditions specified by the user.

Figure 6:
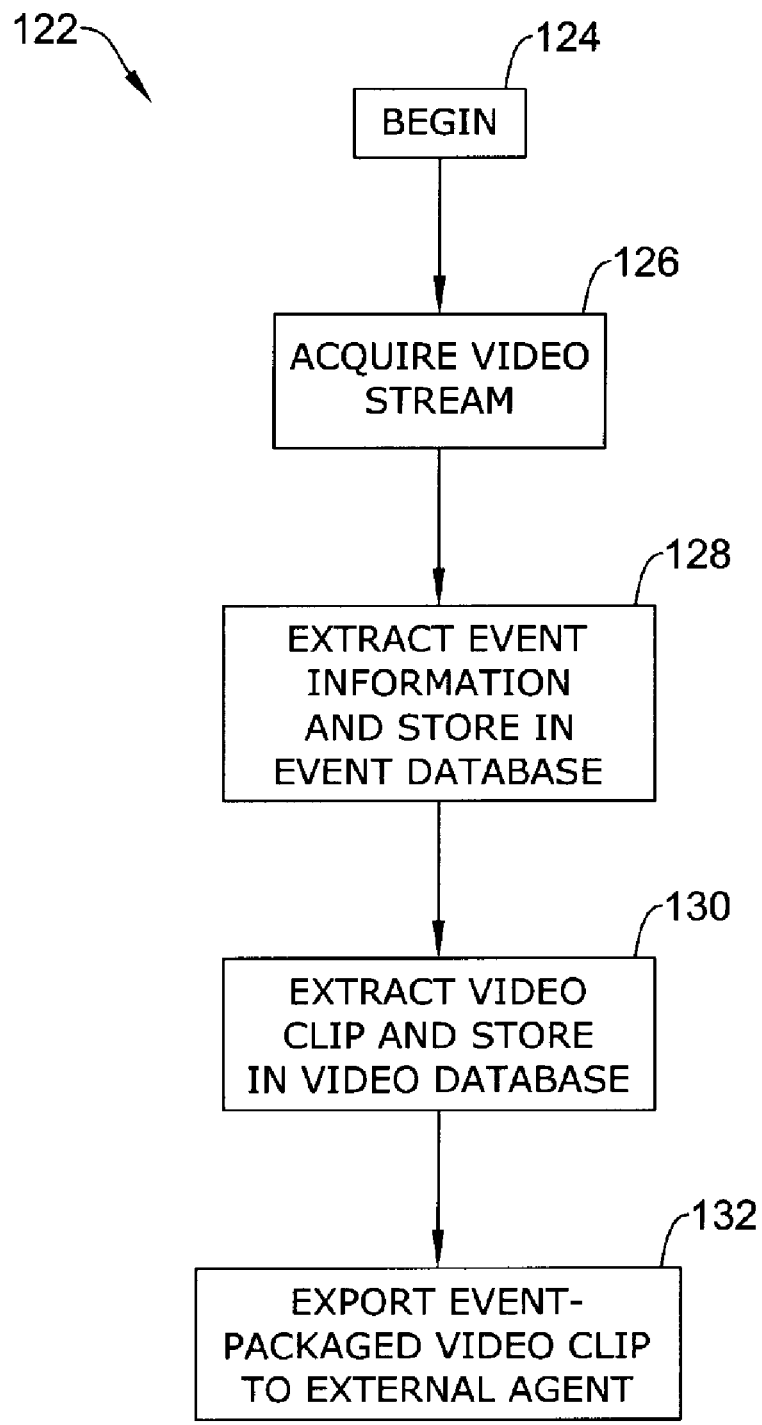
FIG. 6 is a flow chart showing an illustrative method of event-packaging a video sequence in accordance with an exemplary embodiment of the present invention.

Turning now to FIG. 6, an illustrative method 122 of event-packaging a video sequence in accordance with an exemplary embodiment of the present invention will now be described. As shown in FIG. 6, method 122 may begin at block 124, wherein a DVSS or network of DVSS's is/are tasked to acquire a video stream containing an event of interest (block 126). In certain embodiments, for example, the acquired video stream may comprise a digital video stream obtained from an analog camera having a digital IP-addressed streamer, or, in the alternative, a digital camera having a straight digital IP-addressed streamer.

Once a video stream containing an event of interest is acquired, a series of algorithms and/or management functions can be executed to extract various event information from the video stream that can later be used to package a portion of the video stream into a video clip containing the event of interest. As indicated generally by block 128, for example, method 122 may include the step of extracting various event information in a manner similar to that described above with respect to FIG. 3, wherein information regarding an object located within a region of interest is compared and matched against a set of event parameters specified by a user. Examples of such event parameters may include metadata such as the date and time of the event, a header identifying the configured event, the camera or cameras tasked to acquire the video stream containing the event, the location of the event, the type of event detected, the lighting conditions detected by the camera or cameras, the classification of the object triggering the event (e.g. individual, vehicle, animal, animate, inanimate, etc.), the direction of object motion, the color of the object (e.g. red, blue, dark, light, etc.), and/or facial information. In certain embodiments, such event information can be extracted using the video image processing appliance manager 32 and/or one or more of the appliance modules 40, 42, 44, 46 described herein. Once extracted, the event information can then be indexed and stored as event parameters within an event database (e.g. database 38) for subsequent use.

Once event information has been obtained from the video stream, a video clip containing the desired event may be extracted from the video stream and then optionally stored within a video database, as indicated generally by reference to block 130. In certain embodiments, a user-selectable duration of the video stream can be recorded as a video clip within the video database, and can be associated with the one or more of the event parameters (e.g. event description, date, time, camera number, etc.) representing the event. Other characteristics describing the object or objects triggering the event as well as each object's interaction with the region of interest may also contained within the event database, if desired. In some embodiments, a user interface (e.g. a GUI) can be employed to permit the user to adjust the pre-record and/or post-record duration of the video clip, the space or memory allocated to the video clip, the format of the video clip (e.g. MPEG, MJPEG, etc.), the aspect ratio of the video frames within the video clip, as well as other settings. Annotation information such as object labels, motion trails, motion direction arrows, highlighting of detected objects, etc. can also further provided along with the event-packaged video clip, if desired.

Once an event-packaged video clip is extracted and stored within the database, the video clip and associated metadata can then be exported to an external agent, as indicated generally by reference to block 132. The event-packaged video clip may be sent to the external agent either directly or when prompted by the user via the user interface. The event parameters that supported the detection can be associated and sent with the video clip. The databases containing the event information and associated video clips may then be searched using semantic parameters similar to that described above with respect to FIGS. 4-5. If, for example, the user desires to search the event database for those events containing an individual entering a particular region of interest, the user may input a command into a user interface causing any video clips associated with that particular event to be retrieved from the video database. The video clip containing the event as well as the event parameters used to define the event can then be exported to an external agent for further analysis, if desired. In some embodiments, for example, such event-packaged video clip can be exported to the external agent via a network connection, electronic mail, PDA, phone line, or other suitable transmission means. The event-packaged video clip can also be sent to other locations within the monitoring system such as a terminal station, network storage device or other system appliance.

By automatically providing an event-packaged video clip containing the event of interest, the search time usually required to locate an event within a video sequence may be reduced significantly. Moreover, such event-packaged video clips may reduce the time required for an operator to respond to an event, allowing quicker response times to be achieved in some applications.

Figure 7:
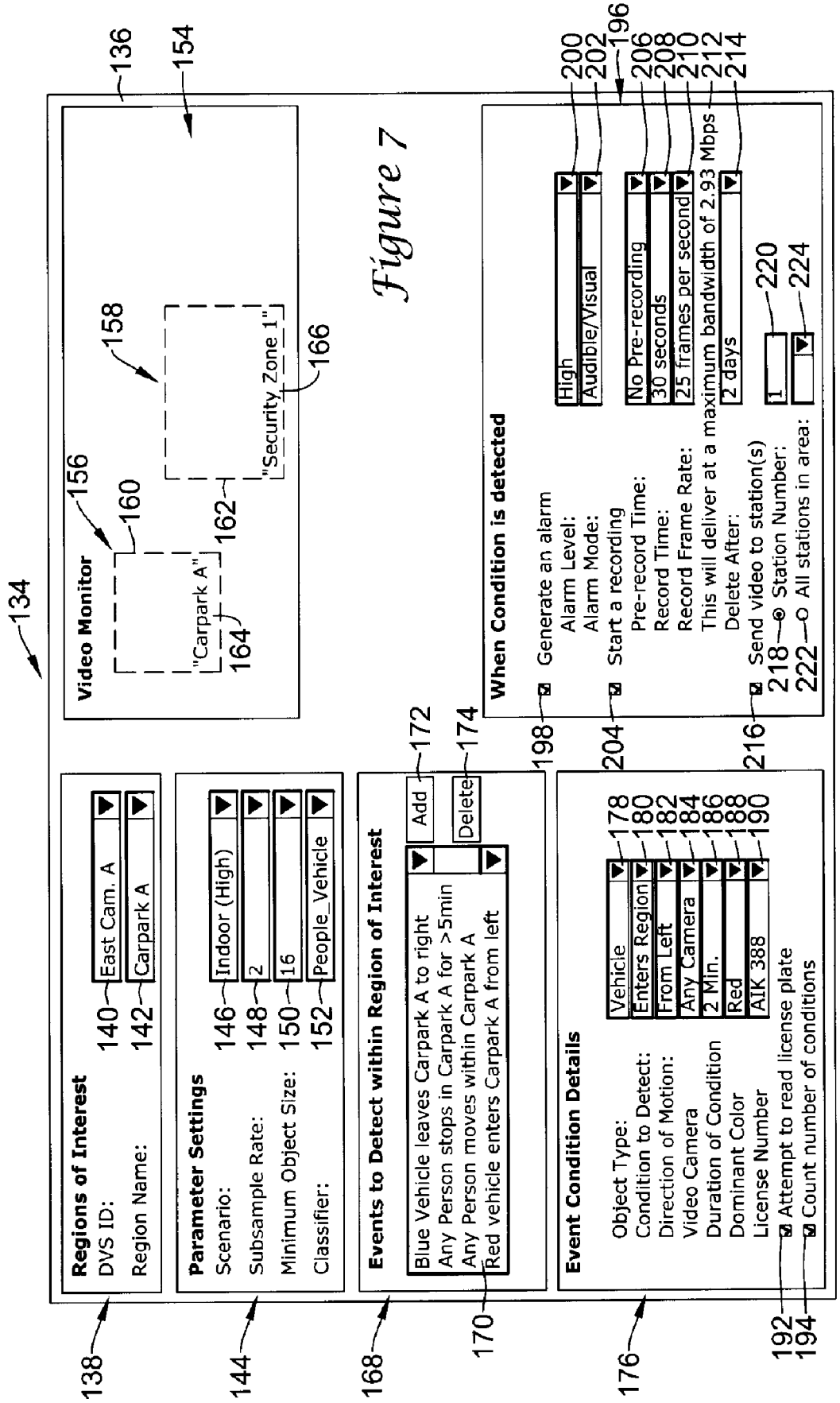
FIG. 7 is a pictorial view showing an illustrative graphical user interface in accordance with an exemplary embodiment of the present invention.

Referring now to FIG. 7, an illustrative graphical user interface 134 in accordance with an exemplary embodiment of the present invention will now be described in conjunction with the illustrative appliance manager 32 of FIG. 2. Graphical user interface 134 may include a display screen 136 configured to display various information related to events configured within the appliance manager 32 as well as the various appliance modules (e.g. the event detection module 54). In the illustrative embodiment of FIG. 7, for example, the graphical user interface 134 may include a REGIONS OF INTEREST section 138 that permits the user to identify various regions of interest within the field of view (FOV) of a DVSS in the monitoring system. The REGION OF INTEREST section 138 may include a DVS ID menu button 140 that can be used to specify where the region of interest is location, and a REGION NAME menu button 142 that can be used to name a particular region of interest (e.g. "Carpark A") in which to detect events. The region name uniquely associates with an area in the FOV of the DVSS whose identity is specified by the DVS ID menu button 140. This area can be displayed and annotated in the display screen 136 of the graphical user interface 134. When selected via a mouse, keyboard, keypad, touch screen, or other suitable selection means, the graphical user interface 134 can be configured to display a list of those regions of interest available for detection within the FOV of the DVS ID 140 by the monitoring system.

Other information (e.g. the coordinates of the corners of the region of interest) can also be displayed and/or be configured via the graphical user interface 134, if desired. In the illustrative embodiment of FIG. 7, for example, the graphical user interface 134 may include a PARAMETER SETTING section 144 that permits the user to specify the parameter values of the various appliance modules. A SCENARIO menu button 146 within the PARAMETER SETTING section 144 can be provided to permit the user to adjust the sensitivity at which events are detected. If, for example, the selected region of interest is located indoors where lighting conditions are typically bright, the user may select "Indoors (High)" or other appropriate text using the SCENARIO menu button 146. Other suitable selections such as "Outdoors (Low)" or "Mixed Conditions (Intermediate)" may also be implemented using the SCENARIO menu button 146, if desired. In some embodiments, a SUB-SAMPLING menu button 148 and MINIMUM OBJECT SIZE text box 150 may also be provided to permit the user to adjust the sub-sampling rate of images captured and/or to set the minimum size of objects to be detected. In some embodiments, a CLASSIFIER menu button 152 may be provided to permit the user to specify which classifier and its associated parametric values to be used in classifying the object. Other parameters in addition to those specifically depicted in FIG. 7 may also be provided to facilitate operation and/or configuration of the monitoring system, if desired.

A VIDEO MONITOR section 154 of the graphical user interface 134 can be configured to display video images and/or still images acquired by one or more of the DVSS's within the monitoring system. In some embodiments, the DVS ID, which captures the video image, may also be superimposed on the VIDEO MONITOR section 154. In the illustrative view depicted in FIG. 7, for example, the graphical user interface 134 is shown displaying a first region of interest 156 in an upper-left portion of the VIDEO MONITOR section 154, and a second region of interest 158 in a lower-right portion of the VIDEO MONITOR section 154. Each region of interest 156, 158 can be demarcated on the display screen 136 using a dashed boundary box 160, 162 or other suitable visual indicator. In some embodiments, the corresponding region name (e.g. "Carpark A", "Security Zone 1", etc.) 164, 166 may also be superimposed on each region of interest 156, 158 displayed on the display screen 136, if desired.

An EVENTS TO DETECT WITHIN REGION OF INTEREST section 168 of the graphical user interface 134 can be provided to permit the user to select those event conditions to be detected within the particular region of interest selected via the REGION NAME menu button 142. A list of event conditions currently programmed within the monitoring system can be displayed within a text box 170 located within section 168. An ADD icon button 172 located to the right of the text box 170 can be provided to permit the user to add additional event conditions to be detected by the monitoring system. A DELETE icon button 174 also located to the right of the text box 170, in turn, can be provided to permit the user to delete one or more event conditions currently programmed within the monitoring system. If desired, the current event condition selected within the text box 170 (i.e. "Red Vehicle Enter Carpark A From Left") can be highlighted by blinking text, italics, inverted text, or other suitable visual means. When the ADD icon button 172 is selected, the user can be prompted to enter the desired event conditions.

An EVENT CONDITION DETAILS section 176 of the graphical user interface 134 can be configured to permit user entry as well as display those details associated with each event condition configured within the monitoring system. In the illustrative embodiment of FIG. 7, for example, an OBJECT TYPE menu button 178 and a CONDITION TO DETECT menu button 180 can be provided to permit the user to select the type of object and event condition(s) to be detected. If, for example, the user desires to monitor vehicles entering a carpark, the user may select "vehicle" using the OBJECT TYPE menu button 178 and "enters region" using the CONDITION TO DETECT menu button 180. Examples of other object types or classifications that can be selected using the OBJECT TYPE menu button 178 may include "individual", "animal", "animate object", "inanimate object", "any object", "unknown object", etc. Examples of other types of event conditions that can be selected using the CONDITION TO DETECT menu button 180 may include "start track", "stop track", "exits region", "movement detected", etc.

A DIRECTION OF MOTION menu button 182 can be provided to permit the user to select the direction or directions in which an object triggers an event. If, for example, the user desires to detect only those events in which an object travels through a region of interest from the left, the user may select "From Left" using the DIRECTION OF MOTION menu button 182, causing the monitoring system to perform an action response only when the object is traveling from this direction. Alternatively, if the user desires to detect only those events in which an object is traveling from the right, from above, or from below, the user may select "From Right", "From Above", and/or "From Below" or other appropriate text using the DIRECTION OF MOTION menu button 182, causing the monitoring system to perform an action response only when the object is traveling from these directions. If desired, the graphical user interface 134 may permit the user to select multiple directions (e.g. "From Left" and "From Below)" in which to detect and/or track object motion.

In certain embodiments, the graphical user interface 134 can be configured to permit the user to specify more complex motion to be detected and tracked. If, for example, the user desires to detect when an object traverses a serpentine-like path within a particular region of interest, the user may select "Serpentine Path" or other appropriate text using the DIRECTION OF MOTION menu button 182, causing the monitoring system to perform an action response when the object travels in such pattern. Other user-specified directions and/or paths can be further implemented in similar fashion via the DIRECTION OF MOTION menu button 182, if desired.

A VIDEO CAMERA menu button 184 can be provided to permit the user to select those video cameras to be tasked in detecting events. If, for example, the user desires to separately task one or more video cameras (e.g. "Camera 1", "Camera 2", "Cameras 1 & 2", etc.) to detect object motion within a particular region of interest, the user may select the appropriate camera name using the VIDEO CAMERA menu button 184. Alternatively, and as shown in FIG. 7, if the user desires to task all of the video cameras to detect a particular event, the user may select "Any Camera" or other appropriate text using the VIDEO CAMERA menu button 184. In certain embodiments, other components (e.g. motion sensors, temperature sensors, etc.) used by the video monitoring system to detect events may be tasked in similar fashion using the VIDEO CAMERA menu button 184, if desired.

A DURATION OF CONDITION menu button 186 can be provided on the graphical user interface 134 to permit the user to select the period of time necessary to trigger an event. If, for example, the user desires to trigger only those events lasting for a duration of two minutes or more, the user may select "2 Min" or other appropriate text using the DURATION OF CONDITION menu button 186. Other durations (e.g. "1 Min", "30 Min", "1 Hr.", "4 Hrs.", "1 Day", etc.) may also be provided via the DURATION OF CONDITION menu button 186 to permit the user to select other time periods, as desired. In some embodiments, the graphical user interface 134 can be configured to accept a user-specified duration if the user desires to set a time period different than that contained in memory.

In certain embodiments, a DOMINANT COLOR menu button 188 and LICENSE NUMBER menu button 190 can be provided to permit the user to select the color and/or license number of any vehicles to be detected by the monitoring system. If, for example, the user desires to detect only those vehicles that are of a particular color (e.g. "red", "green", "blue", "white", "light", "dark", etc.) or of a particular license plate number or type (e.g. "AAIK388", <Minnesota>, <Blacklisted>, etc.), the user may enter such information into the graphical user interface 134 via the DOMINANT COLOR and LICENSE NUMBER menu buttons 188, 190. A set of selection boxes 192, 194 can be selected on the display screen 136 to task the monitoring system to attempt to read license plate numbers and/or to count the number of event conditions satisfied. In certain embodiments, for example, box 194 can be selected if the user desires to count the number of vehicles, individuals, and/or other objects passing in and out of a region of interest such as a security checkpoint.

A WHEN CONDITION IS DETECTED section 196 of the graphical user interface 134 can be provided to permit the user to select those actions to be associated with a particular event. An ALARM selection box 198 can be selected to generate an alarm when an event is detected by the monitoring system, or when an error or other user-specified condition has occurred. If desired, an ALARM LEVEL menu button 200 can be provided to vary the level of the alarm (e.g. "High", "Medium", "Low", etc). In certain embodiments, an ALARM MODE menu button 202 can be provided to toggle the mode (e.g. "Audible Only", "Audible/Visual", "Visual Only") of the alarm, when activated.

A START RECORDING selection box 204 can be selected to activate a recording when one or more events are detected by the monitoring system. A PRE-RECORD TIME menu button 206 and RECORD TIME menu button 208 within section 196 can be provided to permit the user select the amount of time to be allocated to recording before and after the detected event. In the illustrative view depicted in FIG. 7, for example, "No Pre-recording" and "30 seconds" are shown selected using the PRE-RECORD TIME and RECORD TIME menu buttons 206, 208, causing the monitoring system to record for a period of 30 seconds after the detection of an event. If the user desires to increase or decrease the time allocated for recording, or if the user desires to pre-record video prior to the occurrence of an event, the user may select menu buttons 206, 208 and make the appropriate adjustments, as desired.

A RECORD FRAME RATE menu button 210 can be further provided to permit the user to adjust the frame rate of each video camera tasked by the monitoring system. If, for example, the user desires to record at a frame rate of 25 fps, the user may select "25 frames per second" or other appropriate text using the RECORD FRAME RATE menu button 210. In certain embodiments, the graphical user interface 134 can be configured to display an alphanumeric message 212 informing the user of the maximum image bandwidth to be delivered by each video camera tasked by the monitoring system. A DELETE AFTER menu button 214 can also be provided to permit the user to specify a time period (e.g. "1 day", "2 days", "1 week", "1 month", "indefinitely", etc.) in which to store the recorded video clip prior to being deleted.

A SEND VIDEO TO STATION(S) selection button 216 can be selected to output video feeds to selected stations upon the detection of an event by the monitoring system. If, for example, the user desires to output video to a particular terminal or network station, the user may select a STATION NUMBER icon button 218 on the graphical user interface 134 and then enter the particular station or stations in which to feed the video using text box 220. Alternatively, if the user desires to output video to all stations tasked to monitor a particular area, the user may select the ALL STATIONS IN AREA icon button 222 on the graphical user interface 134 and select the appropriate area (e.g. "Region A", "Zone B", etc.) using menu button 224.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A computer implemented method of event-packaging a video sequence, comprising the steps of:
   acquiring a video stream containing an event of interest and providing the acquired video stream to a video processing system;
   the video processing system extracting event information from the video stream and storing one or more event parameters within an event database;
   the video processing system detecting a user-defined event from the video stream;
   the video processing system extracting a video clip from the video stream containing the event of interest;
   the video processing system associating metadata representing the event parameters with the extracted video clip; and
   the video processing system exporting the video clip containing the event of interest and the associated metadata to an external agent.

2. The method of claim 1, wherein the video processing system comprises a video image-processing appliance manager in communication with one or more appliance modules.

3. The method of claim 2, wherein said one or more appliance modules includes a video detection module, a video motion tracking module, an object classification module, and an event detection module.

4. The method of claim 2, wherein said one or more appliance modules includes a face detection module, a face tracking module, a face recognition module, and an event detection module.

5. The method of claim 2, wherein said step of extracting event information from the video stream is accomplished automatically using at least one of said one or more appliance modules.

6. The method of claim 2, wherein said step of extracting event information from the video stream is accomplished automatically using the appliance manager.

7. The method of claim 1, further including the step of storing the video clip within a video database after said step of extracting the video clip from the video stream containing the event of interest.

8. The method of claim 7, wherein said step of storing the video clip includes the step of associating the metadata to the stored video clip.

9. The method of claim 1, wherein the video processing system comprises a graphical user interface.

10. The method of claim 9, wherein the graphical user interface includes a control for adjusting the pre-record and/or post record duration of the extracted video clip.

11. The method of claim 9, wherein the graphical user interface includes a control for providing annotation information along with the extracted video clip.

12. The method of claim 1, further including the step of comparing extracted event information against a set of user-specified event parameters.

13. The method of claim 12, wherein said one or more user-specified event parameters are selected from the group of event parameters consisting of a date parameter, a time parameter, a camera identification parameter, a location of event parameter, a type of event parameter, a lighting parameter, an object type parameter, a direction of object motion parameter, a color of object parameter, and a license number parameter.

14. The method of claim 12, wherein said one or more user-specified event parameters are semantic parameters.

15. The method of claim 12, further including the step of searching the event database using the one or more user-specified event parameters.

16. The method of claim 1, wherein said step of exporting the video clip containing the event of interest to an external agent includes the step of sending a video clip and associated metadata to a terminal station.

17. The method of claim 1, wherein said step of exporting the video clip containing the event of interest to an external agent includes the step of sending a video clip and associated metadata to a networked storage device.

18. A computer implemented method of event packaging a video sequence, comprising the steps of:
   acquiring a video stream containing an event of interest and providing the acquired video stream to a video processing system;
   the video processing system extracting event information from the video stream and storing one or more event parameters within an event database;
   the video processing system detecting a user-defined event from the video stream;
   the video processing system extracting a video clip from the video stream containing the event of interest and storing the extracted video clip within a video database; and
   the video processing system exporting the video clip containing the event of interest to an external agent.

19. A computer implemented method of event-packaging a video sequence, comprising the steps of:

acquiring a video stream containing an event of interest and providing the acquired video stream to a video processing system;

the video processing system extracting event information from the video stream and storing one or more event parameters within an event database;

the video processing system extracting a video clip from the video stream containing the event of interest and storing the extracted video clip within a video database;

the video processing system associating metadata representing the event parameters with the extracted video clip; and the video processing system searching the event database using one or more user-specified event parameters and retrieving an associated video clip from the video database.

20. A computer implemented method of event packaging a video sequence, comprising the steps of:

providing a video processing system that includes a graphical user interface;

the video processing system acquiring a video stream containing an event of interest;

the video processing system extracting event information from the video stream and storing one or more event parameters within an event database;

the video processing system comparing the extracted event information against a set of user-specified event parameters, wherein the set of user-specified event parameters having been previously configured using the graphical user interface of the video processing system;

the video processing system extracting a video clip from the video stream containing the event of interest; and the video processing system exporting the video clip containing the event of interest to an external agent.

21. The method of claim 20, wherein the graphical user interface of the video processing system includes a control for adjusting the pre-record and/or post record duration of the extracted video clip.

22. The method of claim 20, wherein the graphical user interface of the video processing system includes a control for providing annotation information along with the extracted video clip.

23. The method of claim 20, wherein said one or more user-specified event parameters are selected from the group of event parameters consisting of a date parameter, a time parameter, a camera identification parameter, a location of event parameter, a type of event parameter, a lighting parameter, an object type parameter, a direction of object motion parameter, a color of object parameter, and a license number parameter.

24. The method of claim 20, wherein said one or more user-specified event parameters are semantic parameters.

25. The method of claim 20, further including the step of searching the event database using the one or more user-specified event parameters.

26. The method of claim 20, wherein said step of exporting the video clip containing the event of interest to an external agent includes the step of sending a video clip and associated event parameters to a terminal station.

27. The method of claim 20, wherein said step of exporting the video clip containing the event of interest to an external agent includes the step of sending a video clip and associated event parameters to a networked storage device.

28. A computer implemented method of event-packaging a video sequence, comprising the steps of:

providing a video image-processing appliance manager in communication with one or more appliance modules;

providing a graphical user interface in communication with the appliance manager;

acquiring a video stream containing an event of interest;

automatically extracting event information from the video stream using the appliance manager and/or one or more of the appliance modules;

storing one or more event parameters within an event database;

extracting a video clip from the video stream containing the event of interest; and exporting the video clip containing the event of interest to an external agent.

29. The method of claim 28, wherein said one or more appliance modules includes a video detection module, a video motion tracking module, an object classification module, and an event detection module.

30. The method of claim 28, wherein said one or more appliance modules includes a face detection module, a face tracking module, a face recognition module, and an event detection module.

31. The method of claim 28, further including the step of storing the video clip and associated event parameters within a video database after said step of extracting the video clip from the video stream containing the event of interest.

32. The method of claim 28, wherein the graphical user interface includes a means for adjusting the pre-record and/or post record duration of the extracted video clip.

33. The method of claim 28, wherein the graphical user interface includes a means for providing annotation information along with the extracted video clip.

34. The method of claim 28, further including the step of comparing the extracted event information against a set of user-specified event parameters.

35. The method of claim 34, wherein said one or more user-specified event parameters are selected from the group of event parameters consisting of a date parameter, a time parameter, a camera identification parameter, a location of event parameter, a type of event parameter, a lighting parameter, an object type parameter, a direction of object motion parameter, a color of object parameter, and a license number parameter.

36. The method of claim 34, wherein said one or more user-specified event parameters are semantic parameters.

37. The method of claim 34, further including the step of searching the event database using the one or more user-specified event parameters.

38. The method of claim 28, wherein said step of exporting the video clip containing the event of interest to an external agent includes the step of sending a video clip to a terminal station.

39. The method of claim 28, wherein said step of exporting the video clip containing the event of interest to an external agent includes the step of sending a video clip to a networked storage device.

40. A method of event-packaging a video sequence, comprising the steps of:

providing a video image-processing appliance manager in communication with one or more appliance modules;

providing a graphical user interface in communication with the appliance manager;

acquiring a video stream containing an event of interest;

automatically extracting event information from the video stream using the appliance manager and/or one or more of the appliance modules;

comparing the extracted event information against a set of user-specified event parameters configured using the graphical user interface;

storing one or more event parameters within an event database;

extracting a video clip from the video stream containing the event of interest; and exporting the video clip containing the event of interest to an external agent.

* * * * *